April 16, 1940.　　　　H. D. STARR　　　　2,197,668
FEELER GAUGE
Filed Feb. 20, 1939
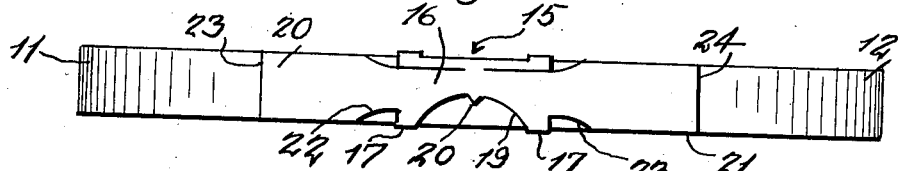
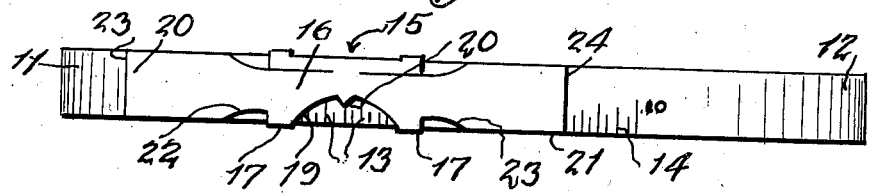
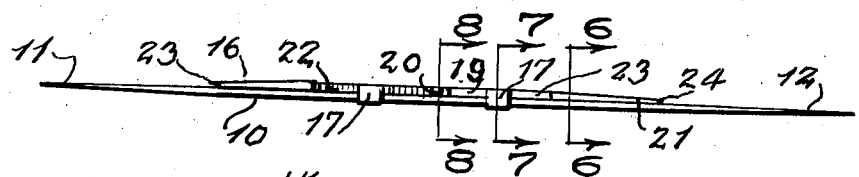
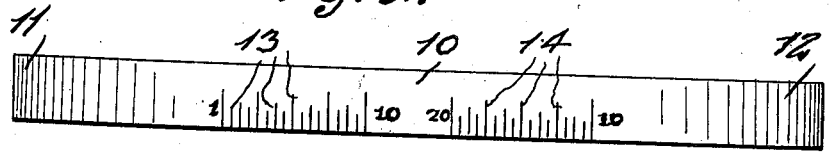
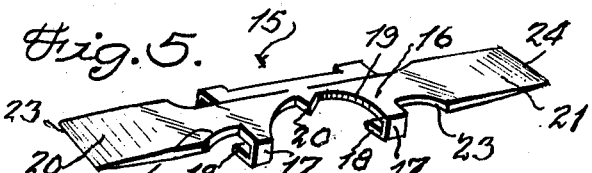
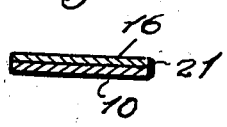　　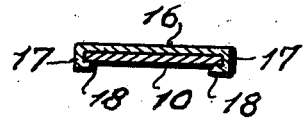　　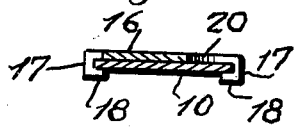
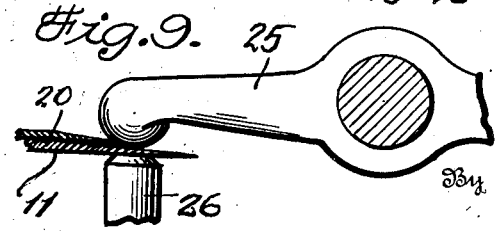
Inventor
Howard D. Starr.
By Bryant & Lowry
Attorneys Patented Apr. 16, 1940

2,197,668

UNITED STATES PATENT OFFICE 2,197,668

FEELER GAUGE

Howard D. Starr, Los Angeles, Calif.

Application February 20, 1939, Serial No. 257,489

1 Claim. (Cl. 33—168)

This invention relates to certain new and useful improvements in feeler gauges and more particularly to feeler gauges of the adjustable type.

The primary object of this invention is to provide a feeler gauge having a wedge-shaped feeler at each end thereof cooperating with a slide limiter and indicating device.

A further object of this invention is to provide an adjustable feeler gauge of the above mentioned character which may be employed for determining the distance between machine parts without resorting to the use of a plurality of thickness gauges as is commonly the present practice.

A still further object of this invention is to provide an adjustable feeler gauge having wedge-shaped portions at each end thereof and graduations on the intermediate portion over which is adapted to slide an indicating device having a pointer capable of registering with the graduations to indicate the thickness of the wedge-shaped portion exposed to the machine parts to be gauged.

A still further object of this invention is to provide a feeler and thickness gauge of the above mentioned character which may be adjusted to the desired thickness to determine the distance between machine parts thereby eliminating the use of individual thickness or feeler devices and providing a compact device, easily carried in the pocket and comprising comparatively few parts to become lost or out of order.

Other objects and advantages of the invention will become apparent during the course of the following description, read in connection with the accompanying drawing, wherein, Figure 1 is a top elevational view of the device embodying this invention, illustrating the slide member positioned intermediate the ends of the tapered gauge member;

Figure 2 is a top elevational view of the same illustrating the slide indicator shifted to one side of the gauge member and showing one of the limiting stops presented to one end or tapered position thereof;

Figure 3 is a side elevational view of the gauge illustrating the wedge portions formed at each end of the device and showing the manner in which the indicator is slidably mounted thereon intermediate the ends thereof;

Figure 4 is a top elevational view of the graduated gauge member showing the slide removed;

Figure 5 is a perspective view of a slide indicator illustrating the gripper arms and showing the opposite limiting devices which may be alternately presented to opposite ends of the gauge device;

Figure 6 is a vertical cross sectional view taken on line 6—6 of Figure 3, looking in the direction of the arrows;

Figure 7 is a vertical cross-sectional view taken on line 7—7 of Figure 3, looking in the direction of the arrows;

Figure 8 is a vertical cross-sectional view taken on lines 8—8 of Figure 3, looking in the direction of the arrows, illustrating the pointer which registers with the graduations on the gauge device; and Figure 9 is a vertical cross-sectional view through a portion of a valve gear showing the push rod and rocker arm and illustrating the manner in which the device embodying this invention is used.

In the drawing, wherein for the purpose of illustrating the invention and wherein like reference characters will be employed to designate like parts throughout the same, the reference character 10 will generally be employed to designate an elongated gauge member having each end tapered as at 11 and 12.

Intermediate the tapered portions 11 and 12 are formed a series of graduations 13 and 14 which read from the center of the gauge device toward each end 11 and 12. The gauge device 11 is preferably formed of spring material but obviously could be formed of Celluloid or a cellulose derivative product.

Cooperating with the graduated gauge device 10 is a slide indicator 15 comprising an elongated strip 16 formed of metal or other material having stamped therefrom lugs 17 provided with ears 18 adapted to embrace opposite edges of the elongated gauge 10. The strip 16 is cut away as at 19 and is provided with a projection 20 forming an indicator capable of cooperating with the graduations 13 and 14 marked on the elongated gauge 10.

Wings 20 and 21 are formed on opposite ends of the elongated strip 16 and are connected thereto by corresponding reduced portions 22 and 23 adding to the resiliency of the wings with respect to the strip 16 so that the same will be urged into close engagement with the elongated gauge strip 10.

In the use of the feeler gauge as shown in Figure 9, either tapered end 11 or 12 of the gauge strip 10 is inserted between the machine parts, such as the rocker arm 25 and push rod 26 as far as it will go or until the upper and lower faces of the tapered end contact the machine parts. Thereafter, the slide 15 is moved over the gauge strip 10 a distance to cause the adjacent tapered end 23 or 24 of the slide to contact the adjacent machine part and the reading of the graduations 13 or 14 with the aid of the indicator 20 discloses the distance between the machine parts being gauged.

It is to be understood that the form of invention herein shown and described is to be taken as the preferred embodiment of the same but that various changes in the size, shape and arrangement of parts may be resorted to without departing from the spirit and scope of the invention as claimed.

I claim:

A thickness gauge comprising relatively thin elongated strip, having a tapered end portion, graduations formed intermediate the ends of the strip corresponding to proportionate thicknesses of the tapered end portion, a slide movably mounted upon the elongated strip, an indicator associated with the slide cooperable with the graduations on the strip and an extension formed on the slide having a tapered end presented to the tapered end portion of the elongated strip with the tapers of the extension and end portion of the strip extending in the same direction and with the operative end of the tapered extension spaced from the main body portion of said slide whereby said tapered end portions may be placed between machine parts within the limits of said tapered portions without interference from said slide.

HOWARD D. STARR.